Patented Mar. 18, 1941

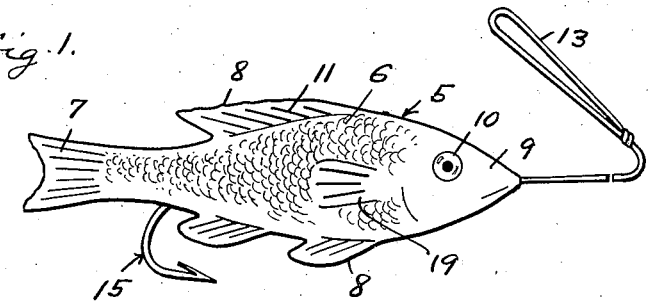
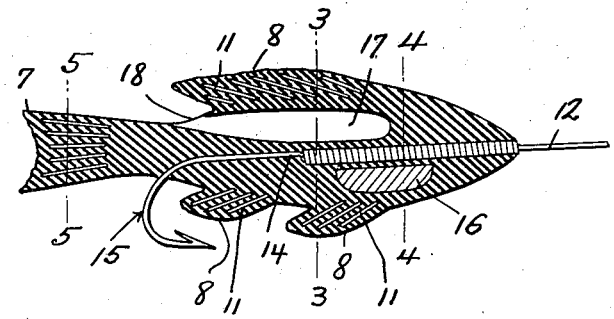
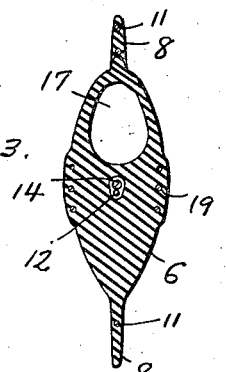
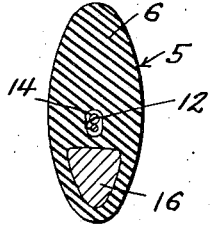
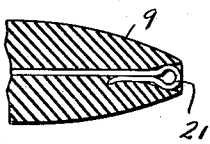
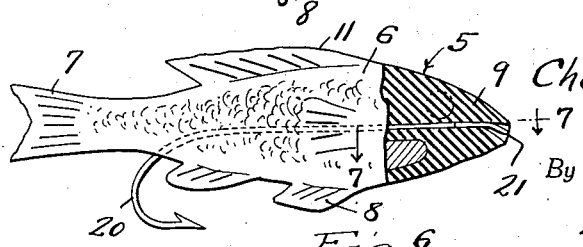

2,235,600

UNITED STATES PATENT OFFICE 2,235,600

SEMIARTIFICIAL FISH BAIT OR LURE

Chester A. Ammerman, Lodgepole, Nebr.

Application February 8, 1940, Serial No. 317,932

2 Claims. (Cl. 43—46)

This invention relates to a semi-artificial fish bait or lure especially adapted for use with light tackle, and has for the primary object the provision of an efficient and inexpensive device of this character which will be practically indestructible and will be extremely realistic of a minnow or small fish and will have means for the accommodation of fish meat or skin as a fish food which will gradually leave the device under pressure of the water to be obtained by fish and thereby provide a lure which will be readily acceptable to fish or in other words fish will be attracted thereby and will grab the same as a live bait.

With these and other objects in view, the invention consists in certain novel features of construction, combination and arrangement of parts to be hereinafter more fully described and claimed.

For a complete understanding of my invention, reference is to be had to the following description and accompanying drawing, in which—

Figure 1 is a side elevation illustrating a semi-artificial fish bait or lure constructed in accordance with my invention.

Figure 2 is a vertical sectional view illustrating the same.

Figure 3 is a transverse sectional view taken on the line 3—3 of Figure 2.

Figure 4 is a transverse sectional view taken on the line 4—4 of Figure 2.

Figure 5 is a transverse sectional view taken on the line 5—5 of Figure 2.

Figure 6 is a side elevation partly in section, showing a modification of this invention.

Figure 7 is a detail sectional view, taken on the line 7—7 of Figure 6.

Referring in detail to the drawing, the numeral 5 indicates as an entirety a lure and which includes a body 6, tail 7, fins 8 and a head 9. These parts are of integral construction and preferably molded from rubber (or latex) with the body having figurations or markings thereon representing scales of a fish while the head 9 is preferably smooth and provided with eyes 10, the color of which may be varied as desired. Further the fins and tail are constructed or moulded of rather thin rubber (or latex) and will have a semi-transparency and embedded in the tail and fins are strands of hair or fibre, as indicated at 11, to give these parts a realistic appearance.

In moulding the body and head a leader 12 is embedded therein and extends outwardly of the head by way of the mouth and has the usual loop 13 for connecting the leader to fishing tackle. The leader extends longitudinally of the head and body and secured thereto is the shank 14 of a fishing hook 15, the barb of which is arranged exteriorly of the body by the shank extending outwardly of the latter adjacent the tail positioning the barb directly under the belly or bottom of the lure with the lower fins in advance thereto.

A weight 16 is embedded in the body and a portion of the head below the leader and the shank of the hook to maintain the lure floating in the water in an upright position.

The body above the shank of the hook and the leader is provided with a chamber 17 which opens outwardly through the rear portion of the body above the tail and below the upper fin 11 in the form of a narrow mouth or opening 18 through which may be inserted fish meat or skin for the filling of the chamber. The fish meat or skin forms a food for the fish and will be gradually expelled from the chamber 17 by way of the opening 18 due to the pressure of water on the body so that the food may be obtained by the fish and consequently render the lure attractive to the fish so that they will readily grab the lure and become hooked by the hook 15 carried thereby. It is a generally accepted fact that fish smell and taste as well as see and, therefore, the lure equipped with means for the accommodation of fish meat or skin will be readily acceptible to fish as a very tasty bait equivalent to live bait. Furthermore the construction and configuration of the body, head, tail and fins gives the lure a realistic appearance of a live fish or minnow especially due to the transparency of the tail and fins and also the gills 19 provided on the head and extending rearwardly on each side of the body. The gills are constructed similarly to the tail and fins.

The lure being constructed principally of rubber will be practically indestructible and also will be more readily acceptable to fish as bait and further the material of the body may be varied in colors to simulate the coloring of selected kinds of minnows or small fish.

If desired as shown in Figures 6 and 7 a hook 20 having an eye 21 may be used in conjunction with the lure 5 wherein a portion of the shank of the hook is embedded in the body 6 and head 9 with the eye protruding from the mouth of the head to permit a spinner type leader to be connected to said eye, consequently permitting the use of this invention with spinners of different construction and other types of leaders.

It is believed that the foregoing description, when taken in connection with the drawing, will fully set forth the construction and advantages of this invention to those skilled in the art to which such a device relates, so that further detailed description will not be required.

Having thus described my invention, what I claim is:

1. In a device of the class described, a yieldable body, head, tail and fin portions integral with said body, a leader having a portion thereof embedded in said body, a weight embedded in the body, a hook fastened to the leader within the body and extending outwardly of the latter with the barb thereof underlying the body, said body having a chamber opening outwardly thereof between the tail and one of the fins to accommodate fish food, said fins and tail portions being of a semi-transparent material, and spaced elements embedded in said tail and fin portions to provide ribs thereto and to give said tail and fin portions a realistic appearance.

2. In a device of the class described, a yieldable moulded body, head, tail and fin portions all of integral construction, said fin and tail portions being moulded of comparatively thin material to provide semi-transparency thereto, spaced elements embedded in the tail and fin portions to form ribs and provide realistic appearance to said portions, said body having a chamber opening outwardly thereof to receive fish food, a leader having a portion thereof embedded in the body, a hook including a shank and barb and having the shank embedded in the body and attached to the leader with the barb arranged exteriorly of the body, and a weight embedded in the body below the leader and the shank of the hook.

CHESTER A. AMMERMAN.